Patented Jan. 3, 1950

2,493,381

UNITED STATES PATENT OFFICE

2,493,381

PROCESS FOR CREASE-PROOFING TEXTILES

Ladislaus Balassa, Riverside, R. I., assignor to The United States Finishing Company, Norwich, Conn., a corporation of Connecticut No Drawing. Application July 1, 1947,
Serial No. 759,462

6 Claims. (Cl. 117—139.4)

This invention relates to a new and improved process for crease-proofing textiles, and is particularly directed to improving the tensile strength, abrasion-resistance, and the smoothness and softness of the fabric.

Ever since thermosetting resins such as methylolmelamine and methylol-urea have been employed for increasing the crease resistance of cellulosic fabrics and for the dimensional stabilization of both cellulosic and woolen fabrics, it has been known that under certain conditions the draping properties, the "hand," the tensile strength and abrasion resistance of the resin-treated fabric suffer in consequence of the resin treatment. In an effort to obtain a good "hand" and good draping properties, such resin-impregnated fabrics have been subjected to very high pressures by squeeze rolls to remove the excess resin solution, and then dried slowly at low temperatures before curing. But even under these conditions it has been impossible to incorporate a large amount of resin into the fabric without producing a harsh hand and lowered tensile strength. When the resin treatment destroyed the tensile strength of the material, it was said that the fabric was "rotted" by the resin.

It is thought that the desirable crease-resistance of a fabric is due to the resin that has penetrated thoroughly into the fibres and that harsh "hand," lack of tensile strength and poor abrasion resistance are due to excess quantities of the resin on the surface of the fibres. However, it has not been possible to avoid forming an excess of resin on the surface of the fibres, or to remove the excess when formed. Part of this difficulty, at least, is due to the nature of the impregnating solutions used. The thermosetting resin solutions intended for the impregnation of textile fabrics require an acid catalyst to accelerate their setting in the fibres at the temperatures used in the curing processes. Ordinary acid catalysts have caused polymerization of the resins before they were applied to the fabric. Considerable losses of resin were suffered and much of the resin was polymerized to such an extent that it was incapable of penetrating the fibres adequately. In order to overcome this, delayed action catalysts are now usually used in order to enable the resin solution to penetrate the fibres before polymerization takes place, i. e., before the catalyst accelerates their setting. The delayed action catalysts have helped somewhat in that they cut down the rate of polymerization of the resins, but they have not prevented it completely. And resin solutions which employ delayed action catalysts, especially resins of the methylol-urea type, show visible signs of instability within a few hours of their preparation. Similar solutions without the catalyst present are stable for weeks and under suitable conditions even for months.

Even when impregnation has been carefully carried out and the fabric carefully treated, some of the resin remains on the surface of the fibres or migrates from within the fibres to their surfaces during drying. It has been practically impossible to remove this surface resin. Attempts have been made to remove it with blotters, but these were unsatisfactory both because the blotters soon became saturated and had to be discarded and because the fabric still retained its stiffness and harsh hand.

One object of the present invention is to inhibit or lessen the deposit of surface resin as much as possible; another is to remove substantially all of the surface resin unavoidably deposited. Other objects are to facilitate penetration of the crease-proofing agent, to introduce a catalyst without detrimental effect on the solution used or on the material treated; to prevent rotting and to obtain fabrics with the softness and fullness normally desired.

These objects have been attained by the process of the present invention, which in its preferred form embraces the introduction of an acid catalyst associated with a hydrophilic material substantially in discrete particle or discontinuous form to a fabric padded with a resin solution, and which in a modified form embraces the step of applying said hydrophilic substance for the purpose of removing surface resin regardless of the type of catalyst and the time it is introduced.

The term "hydrophilic" is here used to designate an affinity for water or water solutions, and encompasses absorbent or adsorbent materials which tend to draw fluid to themselves or to take it up and retain it.

The preferred process is to pad the fabric with a resin solution and then treat the padded fabric with a hydrophilic material in discrete particle form associated with a catalyst. However, the efficacy of the hydrophilic material in removing excess resin is such that any tendency of the catalyst to increase the amount of surface resin is of far less importance than formerly. Hence, the catalyst may, as heretofore, be added to the resin solution and the hydrophilic material applied later, provided (1) that there is adequate penetration to effect sufficient or desired crease-resistance and (2) that the stability or keeping quality of the solution is not a factor.

Consequently, a second and suitable procedure is to add a catalyst to a resin solution, pad the fabric with the solution, and then apply the hydrophilic material.

The first procedure has the advantage that, though either form of catalyst can be used, it is unnecessary to use the delayed action type, and so makes available the use of other and preferred catalysts. A further advantage lies in the fact that premature polymerizations of the resin is prevented, and polymerization occurs almost exclusively during the heat treatment. Since the unpolymerized resin has been given an opportunity to penetrate the fibres before the catalyst effects polymerization, a larger proportion of the resin is polymerized within the fibres. A larger amount of polymerized resin is retained in the fibres and less is lost by being removed as an excess from the surface of the fibres. A third advantage lies in the keeping quality of the resin solution.

The second procedure has the advantage that resin solutions already prepared with delayed action catalysts can be used if desired. The hydrophilic material performs the single function of removing excess resin, and does not need to serve as a carrier.

The particles of hydrophilic material are preferably brushed or dusted into the padded fabric. The size range of the material is determined largely by the ability of the particles to penetrate the fabric being treated. Ordinarily the major proportion of the particles will not exceed two microns, although there may be a substantial portion which range from two to fifty microns. The smaller particles will penetrate more easily, the larger will provide "body" and help prevent caking or adhesion of the material. A large part of the material used will absorb or adsorb resin solution remaining on the surface of the fibres to form what might be termed discrete particles of accumulation. The excess of material, and the amount of the larger sizes, will provide an overcapacity for absorption which will cause the imbibing layer to be a loose, granular, crumbly layer and not permit it to become saturated and bonded by the resin to the surface of the fabric as a cohesive layer.

After the excess resin solution has been imbibed, which will ordinarily require not substantially over fifteen minutes, the loose particles of accumulation are shaken or brushed off, and the impregnated fabric dried, cured and washed.

The process was used with several substances, of which the following are typical.

*Example I*

200 grams of methylol-urea were dissolved in 100 grams of distilled water at 180° F., then 100 grams more distilled water at 40–60° F. were added to cool the solution quickly. The methylol-urea used was an aqueous dispersion of 50% dry resin solids, referred to in the art as "50 percent cream" because of its creamy consistency. 950 grams of china clay and 50 grams of glacial acetic acid (C. P.) were mixed, the acid being added gradually to the clay. The container was closed and the acid and clay were tumbled for two hours to distribute the acid evenly through the clay. A rayon fabric was padded with the resin solution and weighed to determine the wet pick-up. Then the impregnated fabric was rolled into a small tight roll to avoid air drying of the resin solution. After fifteen minutes the roll was opened and covered with an excess amount of the acid-clay mixture. After the clay was distributed over the surface, it was vigorously brushed into the fabric on both sides. The fabric was shaken to remove loose clay and then without intermediate drying was cured in an oven for four minutes. It was then washed thoroughly to remove as much of the clay as possible, pressed dry in an electric flat bed press and conditioned. The treated fabric so obtained had a soft, firm, full hand. The dry add-on was 20.7%; the crease resistance before laundering was 86% and the crease resistance after four launderings was 84%.

*Example II*

200 grams of methylol-urea (50% cream) were dissolved in 98.25 grams of distilled water at 180° F., and as much more water 40–60° F. was added to cool the solution. 3.5 grams of diammonium phosphate for a catalyst were dissolved in the minimum amount of water required for solution. The catalyst (diammonium phosphate) was added to the resin solution when the solution was cooled below 90°. Spun rayon was padded with this solution and clay without any acid was applied in the same manner as the acid-clay mixture of Example I. Thereafter the fabric was treated as in Example I except that it was oven dried at 230° F., for three minutes before curing. The fabric so treated had a soft, full hand; showed 82% crease resistance, a tensile strength of 63 lbs., and an abrasion resistance substantially equal to that of the original fabric both warpwise and fillingwise.

*Example III*

163.8 grams of methylated methylol-melamine resin, 5.0 grams of the catalyst of Example II and 531.2 grams of distilled water were used to make a resin solution. The catalyst was dissolved in 80 to 100 grams of the water and the melamine resin was diluted with the remainder. The catalyst was then added to the resin solution. A spun rayon fabric was padded as before and treated as in Example I, except that the hydrophilic material was dry china clay to which no acid was added. The fabric was soft and full, had a crease resistance of 92% and a tensile strength of 49 lbs.

In the conventional methods heretofore used, increasing the dry add-on of either methylol-melamine or methylol-urea resins has resulted in fabrics having an increasingly harsh hand with a corresponding decrease in crease-resistance and tensile strength. With the new process, however, considerably increased dry add-on of resin is possible because of the removal of surface resin. The "hand" is definitely better in fabrics treated with the new process even on the basis of the same resin content. The product is more resilient, i. e., more crease-resistant. Using procedures and materials as set out in Example II, it was possible to load as much as 27% of dry resin calculated on the dry weight of the fabric and obtain products of exceptionally high crease-resistance, unusually high tensile strength and no appreciable loss in abrasion resistance. They had a smooth, pleasing hand. The "hand" could also be described as "soft" and "full" as those terms are used in the art. Similar high resin loading in the conventional processes hitherto used resulted in very harsh, stiff and brittle fabrics, with a very great loss in tensile strength.

In addition to the methylol-urea and methylol-melamine resins (80% total solids) used in the examples, other suitable resins are the condensation products of urea, substituted ureas, thiourea and substituted thioureas with formaldehyde, acetaldehyde and other aldehydes as well as their water-soluble ethers such as the methyl and ethyl ethers; substituted melamines and melamines containing a higher ratio of methylol groups to the melamine as well as ethers of methylol melamines; resins derived from phenols with aldehydes such as phenol, resol, xylenol, parahydroxydiphenyl, etc., with formaldehyde, hexamethylenetetramine, furfural or other aldehydes.

Any of the commonly used acid catalysts or potentially acid catalysts may be employed to accelerate the polymerization of the resin. Among these are diammonium phosphate, monoammonium phosphate, diammonium sulphate, ammonium chloride, phthalic anhydride, and acetic acid. Such catalysts as acetic acid, formic acid, citric acid, phthalic anhydride, maleic anhydride which can be used with the process of Example I when they are mixed with the hydrophilic material, could not be employed in the conventional processes now used. The catalysts may also be employed in form of gas or vapors or in a dispersion in air as aerosols during the curing process.

When maleic anhydride was used as the catalyst, the product had a hand and texture of the sort customarily associated with a wool fabric. Also, the crease resistance of the product increased slightly after washing. In general, however, a volatile acid such as acetic acid gives appreciably better results with regard to insolubilization of the resin than is the case with other acids or potentially acid materials whether the latter are used with the hydrophilic material or incorporated in the resin.

It has hitherto usually been customary to subject the fabric to intermediate drying before curing. However, the fabric of Example III was cured directly without such intermediate drying. While such a procedure is undesirable according to hitherto accepted practice, when done with the new process it resulted in a superior product. A crease-resistance of 92% was obtained, and a tensile strength of 49 pounds, both being higher than the control, and definitely the highest obtained with methylol-melamine resins.

Ash tests have shown that in no case was there more than six-tenths of one percent of the hydrophilic material retained by the finished fabric made by the described process when the treated fabric was properly washed. This amount is so negligible that it may be said that substantially all of the hydrophilic material is removed. Somewhat more might be left, but it would not be desirable to do so.

China clay was used in the foregoing examples. Other suitable materials are talc, pyrophyllite, bentonite, and other silicas and silicates such as diatomaceous earth, pumice, volcanic ash and tripoli. Other materials that should be suitable are barytes, blanc fixe, and alumina. Some organic materials such as raw starches, insolubilized starches, wood flour, charcoal and walnut shell flour might be used, but the use of such materials is not recommended. They are expensive, difficult if not impossible to recondition, and hard to remove. Excepting charcoal, most of them contain water of hydration which is difficult to remove without destruction of desirable properties of the materials, and if such organic materials were used, the resin would tend to bind the powder more tightly to the fabric. They are mentioned here only as possible but relatively undesirable substitutes.

The hydrophilic materials may be applied in any convenient manner which will get them into intimate contact with the fibres and thereby effect the absorption of the surface resin. The preferred procedure is to apply the hydrophilic materials by brushing them onto the moist fabrics, usually with rotary brushes. However, other means such as applying them by rollers or spraying them from a spray gun may give satisfactory results. They should be in a state of fine division primarily in the form of discrete particles.

It is possible to incorporate some fibrous hydrophilic materials provided they are substantially discontinuous, i. e., equivalent in over-all effect to the particles and range of sizes heretofore described. Whatever the hydrophilic material, it is substantially insoluble and inert in the resin solutions used. The material must be unsaturated so as to retain its power to take up liquids, and will preferably be dry.

After this material is removed, bearing the resin which it has removed from the surface of the fabric, it is reconditioned and then used again. It is heated above 200° C., for about one-half hour if it contains up to 5% of resin and 15 to 20% of moisture. If the resin content is higher, the material is calcined in a rotary calciner in the presence of air from 15-30 minutes above 500° C. In most cases no higher than 600° C. is required for reconditioning in 15-30 minutes. The absorptive materials should not be heated over 700° C., if the rotary calciner is used, as they might lose water of composition. However, with "flash" calcination, 1000° to 1300° C., may be used for a few seconds. A muffle furnace can also be used.

In the foregoing description "padding" is an impregnation process in which the fabric is dipped in a shallow pan containing the solution and then passed between a pair of squeeze rolls consisting usually of one stainless steel and one synthetic rubber roll. The squeeze pressure of the rolls is adjusted to give approximately 80% wet pick-up (liquid retention) calculated on the weight of the dry fabric. The fabric was usually passed twice through the rolls of the padder, being turned over between passes so that both sides of the fabric were contacted by the steel roll.

The abrasion resistance of the fabric was determined by tests carried out in a Taber Abraser, Model E, 4010, using the method proposed by Kassel (Ernest R. Kassel, Textile Research Journal 16, 502, 521 (1946)). The fabric specimens were abraded to the number of cycles found sufficient to result in a reduction of about 50% of the tensile strength of the untreated controls. The relative resistance noted was accepted to be caused by the resin contained in the fabric.

The term "wet pick-up" is used to mean the increase in weight of the fabric after the padding operation expressed in percentages, and the term "dry add-on" is used to indicate the increase in the weight of the fabric after it has been completely processed.

The crease-resistance was determined with numerical ratings using the Amick method. This is a measure of resiliency of the fabric after creasing. An explanation of this method is given in 24 American Dyestuff Reporter 553, 662, 645 (1935).

The method used in drying was to heat the fabric under a strong current of air to a temperature from 185° to 230° F., and the curing process was to heat the fabric from a temperature of 280° F. to 300° F., for a minimum of three minutes. The washing was done with 10 grams of green soap chips, 10 grams of sodium carbonate dissolved in 400 grams of water at 62° C. The cured fabrics were washed for five minutes, squeezed in a wringer and dried by pressing in an electric flat bed press.

It should be noted that, while the details of the process may be varied somewhat, it is always essential to use an excess of absorptive or adsorptive material, a large part of which is in a finely divided form and all of which is substantially discontinuous. The catalyst is preferably incorporated with this material as a carrier, but may for some purposes be used later and for other purposes be used earlier in the process. Those skilled in the art will appreciate which of the several advantages are to be preferred, according to the particular requirements involved. This does not mean that all of the variations suggested are equivalent, but only that while some features of the process of the invention are essential to its practice, others are optional.

I claim:

1. The process of crease-proofing textile fabrics which comprises applying to a fabric an aqueous solution of a thermosetting polymerizable resin, applying to the said fabric containing the resin solution a discontinuous layer of solid water-insoluble finely divided hydrophilic material, intimately mixing the finely divided material with the excess solution on the surface of the fabric, thereafter removing said mixture whereby the fabric is cleared of any free excess resin solution, and insolubilizing the resin in the presence of an acid catalyst.

2. The process defined in claim 1 in which said acid catalyst is brought into contact with said resin simultaneously with and in the presence of said hydrophilic material.

3. A process defined in claim 1 in which the resin is methylated methylol melamine.

4. A process defined in claim 1 in which the resin is methylol urea.

5. The process defined in claim 1 in which the hydrophilic material is china clay.

6. The process defined in claim 1 in which the hydrophilic material is talc.

LADISLAUS BALASSA.

REFERENCES CITED

The following references are of record in the file of this patent:

UNITED STATES PATENTS

| Number | Name | Date |
|---|---|---|
| 577,283 | Caffall | Feb. 16, 1897 |
| 1,571,074 | Thatcher | Jan. 26, 1926 |
| 2,088,227 | Battye et al. | July 27, 1937 |
| 2,191,326 | Widmer | Feb. 20, 1940 |
| 2,196,256 | Dreyfus | Apr. 9, 1940 |
| 2,219,375 | Widmer | Oct. 29, 1940 |
| 2,224,293 | Finlayson | Dec. 10, 1940 |
| 2,235,141 | Dreyfus | Mar. 18, 1941 |